June 23, 1959 L. W. GOURLEY 2,891,812
SOIL SAMPLING DEVICE
Filed March 12, 1956
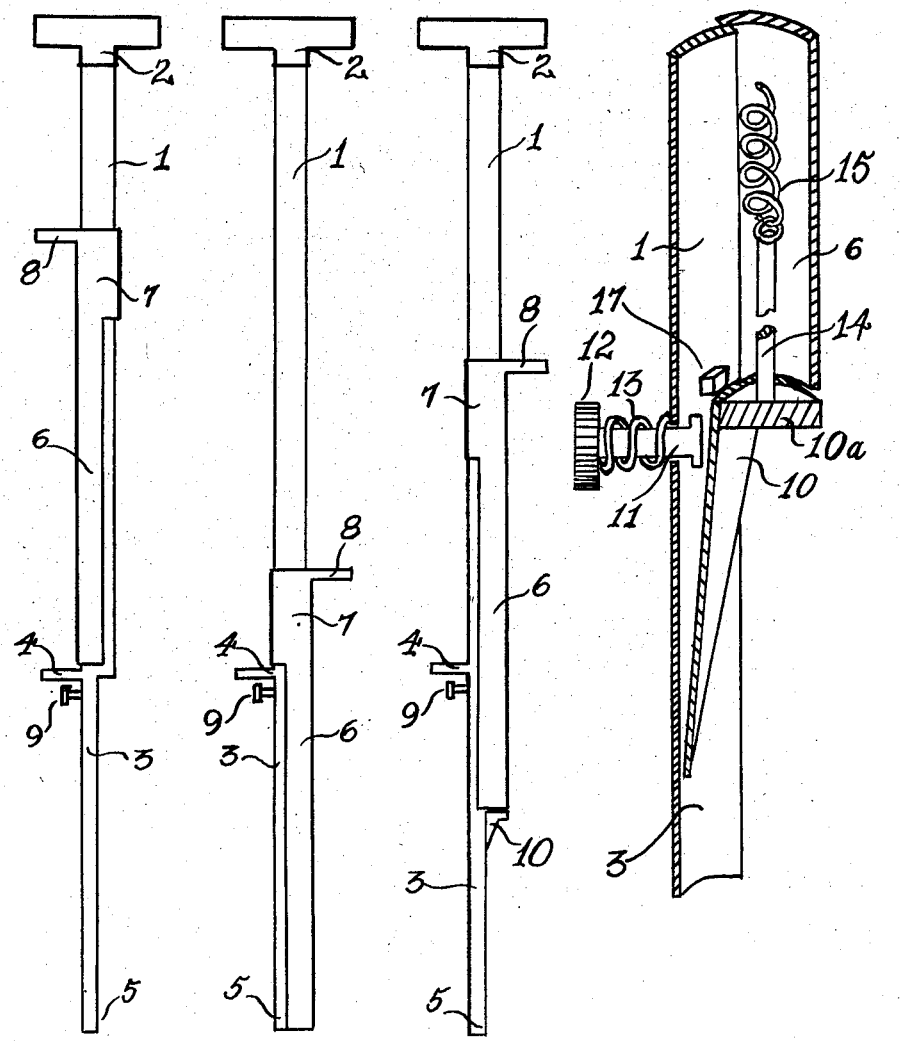
LOCKIE W. GOURLEY
INVENTOR.
BY *Chester L. Davis*
ATTORNEY

United States Patent Office 2,891,812
Patented June 23, 1959

2,891,812

SOIL SAMPLING DEVICE

Lockie W. Gourley, Eolia, Mo.

Application March 12, 1956, Serial No. 570,949

2 Claims. (Cl. 294—50.6)

My invention relates to a soil sampling tool and more particularly to a hand operated tool which may be inserted in the ground from which soil samples are desired.

An object of my invention is to provide a soil sampling tool which will be easy to operate and which will give the user a sample of soil showing accurate types of soil at the different depths.

Another object of my invention is to provide a soil sampling device which obtains the soil sample in a series of three distinct operations performed in sequence.

A better understanding of the improved soil sampling device of my invention can be had from examination of the accompanying drawings wherein; Fig. 1 is a side view of the tool in the first stage of operation; Fig. 2 is a side view of the tool in the second stage of operation; Fig. 3 is a side view of the tool during the third stage of operation; and Fig. 4 is an enlarged view in section of the mechanism which permits the transition between the second and third stages of operation.

It has been the practice for many years for farmers and those generally interested in soil fertility, to take samples of soil in order that the samples may be analyzed and the proper fertilizer and other chemicals and minerals applied according to the crops to be raised. The ideal soil sample will show the different layers, top-soil, humus and sub-soil and these layers are desired to be quite separate and distinct and any device used to obtain such sample must be designed accordingly. The usual practice employed for many years is to use a round pipe which is driven into the ground, after which the sample of soil within the pipe is pushed out and laid on a flat surface for examination and testing. Other types or devices make use of augers and the like, however the driven round pipe is the type most generally used. The driven round pipe has several disadvantages, the first being the difficulty of driving the round pipe into the ground, especially if the ground is hard. The second disadvantage is the difficulty in removing the round pipe once it is driven into the ground. The third disadvantage is the inability to remove the soil sample showing its various and distinct strata or layers, without disturbing the natural distribution of the layers in the sample. All of these disadvantages are avoided in the improved soil sampling device of my invention.

Fig. 1 is a side view of the device of my invention as it would be viewed in the first stage of operation to obtain a soil sample. It consists of an elongated pipe 1, having a handle 2 affixed to the top end of same. The lower section of pipe 1 has been cut lengthwise for the length of approximately one foot, or however deep in the ground the maximum length of sample might ever be desired, from the ground end 5 upward into substantially a half round section designated by the reference numeral 3. A step 4 is affixed to pipe 1 at the approximate place where the substantially half-round section 3 of pipe 1 begins and the lower part of the full round section of pipe 1 ends. Step 4 is for the purpose of forcing section 3 of pipe 1 in the ground. A second round pipe is made up of a full round section 7 which completely encircles pipe 1 for a relatively short distance and which, for the major portion of its length is cut away lengthwise into a substantially half-round section 6. A step 8 is affixed on or near the full round section 7 which, like step 4 on pipe 1, is for the purpose of forcing section 6 into the ground. For clarity of illustration Fig. 1 shows the tool in position for only the first stage of operation, that of forcing section 3 of pipe 1 into the ground. When section 6 is in the position shown in Fig. 1 and step 4 has been used to push section 3 into the ground, the step 8 on parts 6—7 may be of some assistance in that regard since the lower end of section 6 rests now on step 4 of pipe 1, but the purpose of section 6, section 7 and step 8 is mainly to perform the second stage of operation more clearly shown in Fig. 2.

Fig. 2 shows the same parts as are shown in Fig. 1, however several of the parts have changed their position, the second stage of operation having been completed. It will be observed that step 8 has been revolved around pipe 1 approximately 180 degrees and has been pushed downward so that section 6 has traveled into the ground to the same depth as section 3 of pipe 1. The lower ends 5 of both sections 3 and 6 are of course sharpened and as shown are substantially half-round sections but of course may be tapered to a point, if desired. It appears logical that at least one half the force has been obviated in driving section 3 into the ground as would have been required by the use of a full round pipe, and further, that at least no more than one half the force has been expended in driving section 6 into the ground as compared with the force required in driving a full round pipe into the ground.

It will be noticed in Fig. 1 and also in Fig. 2 that a stop 9 is shown immediately under step 4, and stop 9 is also shown in Fig. 3 which illustrates the third stage in the operation of my device. The stop 9 is spring-loaded at 13, Fig. 4, outwardly from pipe 1 and normally is ineffective so far as concerns the first two stages of operation. In Fig. 3 it is seen that section 6 has been raised from its downward position shown in Fig. 2 and that it has again been pressed downward part way toward the ground end 5, this time it having carried a clean-cut plug 10 traveling along the length of section 3, the purpose of which is to remove the soil sample from section 3. The upward movement of section 6 when it was moved from the position shown in Fig. 2 to the position shown in Fig. 3 resulted in clean-out of the sample from section 6 but not the clean-out of the sample from section 3. As section 6 is raised from the position shown in Fig. 2 to the position shown in Fig. 3, the top edge of the soil sample can not follow section 6 upward because clean-out plug 10 can not move upward beyond the lower section 3 near which is positioned a stop 17, and accordingly the top edge of the soil sample not being able to move upward, it remains in section 3 but not in section 6. It is obvious that the device has been lifted from the ground after both sections 3 and 6 have been forced into the ground to obtain the sample, and that Fig. 3 shows the device lifted out of the ground and section 6 raised with respect to section 3. To all intents and purposes the soils have been sampled, the sample has been obtained and is available for testing and examination though it yet remains in section 3. To remove the sample from section 3 so that the tool may be used to obtain additional samples, I desire to remove it from section 3, and this step has only begun as illustrated in Fig. 3. The particular structure of stop 9 and its operation to remove the sample from section 3, is best understood from examination of Fig. 4.

Fig. 4 shows pipe 1 in section intermediate the ends thereof, it being partially surrounded by a second pipe section 6 showing in section the sharpened lower end thereof. Stop 9 shown in Fig. 1, Fig. 2 and Fig. 3 is shown in Fig. 4 in an enlarged side view in section, parts being cut away for clarity of illustration. It here shows stop 9 as passing through the wall of pipe 1 and free to slide in and out, limited in its movement by the enlargement 11 in an outwardly direction and by spring 13 and knob 12 in its inward movement. Spring 13 normally forces the assembly outward as it cooperates with the centering action of spring 15. Spring 15 extends upward within pipe 1 and is attached to rod 14 affixed to washer 10a at the lower end thereof, and in any suitable manner the upward end of the spring 15 is secured near the upward end of pipe 1 at handle 2. The clean-out plug 10 is an elongated partially round section of pipe, having affixed to the upper end thereof a washer 10a. The diameter of washer 10a is such that it will normally allow the sharpened end of section 6 to pass over it rather than to be caught by it. When washer 10a on clean-out plug 10 is pressed inward a small amount, the edge of washer 10a overlaps the sharpened lower edge of section 6 and is accordingly carried downward by it.

What I claim as my invention is:

1. In a soil sampling device the combination of two pipes one telescoping within the other and constituting an inner pipe and an outer pipe, the upper end of said outer pipe encircling said inner pipe for guidance, said inner pipe having a handle at the top, said pipes free to move lengthwise and to rotate with respect to each other, each of said pipes having a sharpened end to enter the ground to be sampled, said inner pipe and said outer pipe each having individual steps affixed thereto, and both of said pipes below said steps and to the sharpened ends of said pipes being reduced to only partially round sections.

2. In a soil sampling device the combination of two pipes one telescoping within the other and constituting an inner pipe and an outer pipe, the upper end of said outer pipe encircling said inner pipe for guidance, said inner pipe having a handle at the top, said pipes free to move lengthwise and to rotate with respect to each other, each of said pipes having a sharpened end to enter the ground to be sampled, said inner pipe and said outer pipe each having individual steps affixed thereto, both of said pipes below said steps and to the sharpened ends of said pipes being reduced in circular extent for an appreciable length thereof to only partially round sections, and means operatively connected to each of said pipes for cleaning out of said pipes the sample obtained.

References Cited in the file of this patent
UNITED STATES PATENTS

| | | |
|---|---|---|
| 828,452 | Barry | Aug. 14, 1906 |
| 2,057,067 | Smith | Oct. 13, 1936 |